July 7, 1964 S. A. JONES 3,139,907
QUARTER TURN HYDRANT LINE TO PUMPER LINE VALVE
Filed Aug. 5, 1960
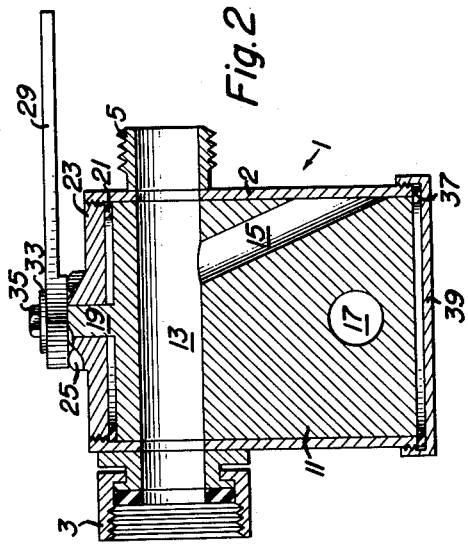
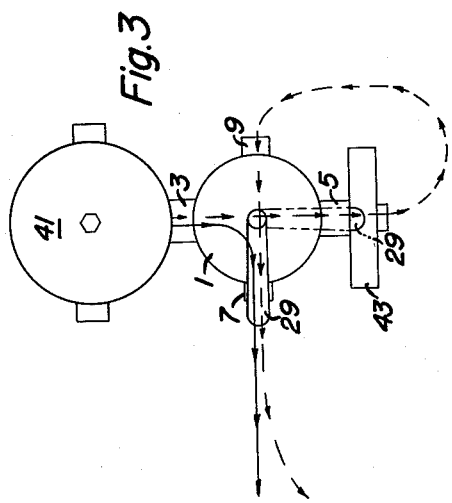
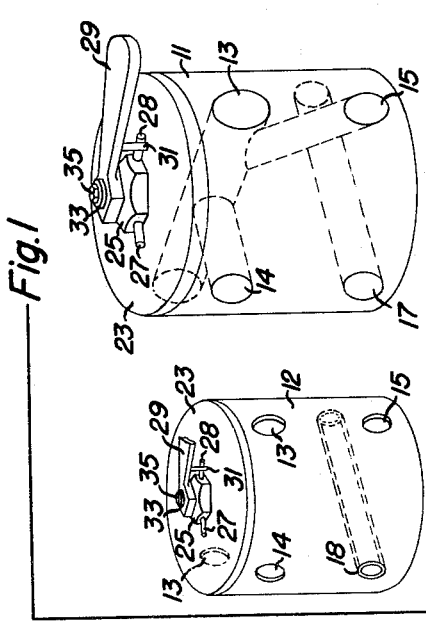
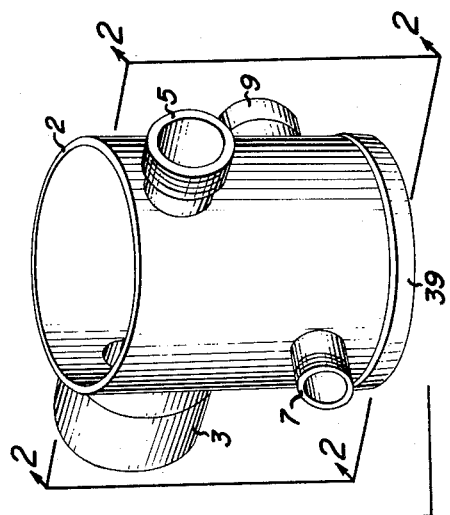
INVENTOR
Samuel A. Jones
BY George Renehan
ATTORNEY

3,139,907
QUARTER TURN HYDRANT LINE TO PUMPER LINE VALVE
Samuel Austin Jones, Main St., P.O. Box 55, Cardiff, Md.
Filed Aug. 5, 1960, Ser. No. 47,882
5 Claims. (Cl. 137—625.29)
(Granted under Title 35, U.S. Code (1952), sec. 266)

The invention described herein may be manufactured and used by or for the Government of the United States of America for governmental purposes without the payment to me of any royalty thereon.

The valve herein described is principally used in connection with a fire hydrant and a pumper of the fire-fighting equipment. The valve is designed in such a manner that when connected to a fire hydrant, it will allow the fire department personnel to bring a stream of water on a fire in a matter of seconds, and while the fire is being held under considerable control by this preliminary stream at hydrant pressure, it will enable the personnel to connect the valve to a fire engine without cutting off the stream. Other objects and advantages of the invention will be apparent from the following description, operation, and the accompanying drawing.

In the drawing:

FIG. 1 shows an exploded view of the valve.

FIG. 2 is a central vertical section of the valve taken on section 2—2 of FIG. 1.

FIG. 3 is a diagrammatic plan view of a fire hydrant, the valve, and a pumper, showing the flow of water.

The valve comprises a cylindrical casing 2 having fittings 3 and 5 positioned diametrically opposite each other in an upper plane perpendicular to the valve axis. Fittings 7 and 9 are positioned diametrically opposite each other in a lower plane of the cylindrical casing and are at right angles to fittings 3 and 5.

Valve key 11 is a cylindrical unit which fits snugly inside casing 2. It has two diametrical ports 13 and 17 positioned at right angles to each other in upper and lower planes respectively. In addition to the diametrical through passageway of port 13, there is a branch passageway 14 at right angles to port 13 and in the same horizontal plane. Another branch 15 is in the same vertical plane and emerges from the key in the horizontal plane of port 17.

Key 11 is provided at the top with a cylindrical extension 19, squared at its upper end. When assembled, the axes of the ports 13 and 14 of the key 11 lie in the same horizontal plane as the axes of fittings 3 and 5, while the axis of port 17 and the center of the lower end of port 15 lie in the same horizontal plane as the axis of fittings 7 and 9. By proper positioning of the valve, the two members, 2 and 11, form a set of completed passage-ways through the valve. The valve is closed at the top by a rubber gasket 21 and a cover 23 which cover is penetrated by the extension 19. The cover 23 has at its top an integral hexagonal ledge 25 and includes limit pins 27 and 28. The squared upper end of the extension 19 projects through a squared opening in a handle 29, the latter having a stop pin 31 at its lower surface adjacent the ledge 25. The handle 29 is held in place by a washer 33 and a screw 35 which is engaged inside of the squared extension 19. The bottom of the valve 1 is sealed off by a rubber gasket 37 and a cover 39.

A further and more economical hollow tubular key 12 may be used in lieu of the key 11. This alternate design may be preferable for some purposes since it will render the unit much lighter and more economical to manufacture. The operative and functional aspects of the tubular key 12 are the same as of the solid key 11. The minor structural differences between the key 11 become merely openings through the wall of the tubular key 12. The port 17 of the key 11 is substituted in the key 12 by the tube 18.

To use the valve in a fire fighting situation, the operator first connects the valve through the fitting 3 of the valve to the fire hydrant 41. The operator then turns handle 29 clockwise until the stop pin 31 of the handle abuts against the limit pin 27. This action will close off all the through passage-ways except the branch ports 14 and 15 which are in communication with each other and are aligned so that when the water in the fire hydrant is released, it will be forced through the fitting 3, port 14, a portion of port 13, port 15, fitting 7 and through a line out to the fire, as shown by the arrow indicating solid line in FIG. 3 of the drawing. While the fire is being fought by this preliminary stream, the firemen, by way of fitting 5, can now easily connect together the valve 1 and the pumper 43 and a line from the pumper to the fitting 9 of the valve, without cutting off the said stream. The pumper 43 is diagrammatically illustrated in FIG. 3. It is to be understood that in reality there is a fire hose from the fitting 5 to pumper 43 and a fire hose from said pumper to the fitting 9. After the latter has been accomplished, the operator turns the handle 29 counter-clockwise until the stop pin 31 abuts against the limit pin 28. When this is done, the ports 14 and 15 become blocked and the preliminary stream of water is instantly diverted to flow from the fire hydrant 41 through the fitting 3, port 13 and the fitting 5 into the pumper 43 where it is built up to a required pressure. The water now under a higher pressure is directed from the pumper through a line into the valve via fitting 9, the port 17, fitting 7 and through the same line out to the fire as shown by the arrow-dotted line in FIG. 3 of the drawing.

The advantages of this valve are obvious in that it eliminates all delay in changing from hydrant supply to pumper supply of water in fire fighting. It frequently happens after a fire alarm, that a hose is available before the pumper arrives. In such case the hose can be attached to the hydrant via this valve and the hydrant water turned on at once. When a pumper arrives, it can be attached to the proper fittings on the valve without interrupting the hydrant flow, as would be the case without the valve. When the proper attachments are made, a 90° turn of the valve changes the water to pumper pressure. Conversely, when a fire is under the control, water can be changed back to hydrant supply and the pumper decoupled without interruption of water flow.

Having fully described one particular form of my invention, it should be understood that I do not intend thereby to limit myself to the precise construction shown, but intend to include all modifications that fall within the spirit and scope of the invention as defined in the following claims.

I claim:

1. A combination valve and key comprising a casing and a hollow key rotatively mounted in said casing, said casing having a first pair of ports aligned in the upper level thereof and a second aligned pair of ports in the lower level thereof transverse to said first pair, said key having an aligned pair of ports and a first transverse port in the upper level and a transversely extending interior tube with a second transverse port in the lower level of said key whereby fluid can flow into said first transverse port, flow down through said key, and flow out said second transverse port at one position of said key and can flow straight through said first pair of ports and said tube in another position of said key.

2. A rotatable key for an auxiliary fire hydrant valve comprising a cylinder having a first set of ports at one level and a second set of ports at a second level thereof, said first set comprising a pair of diametrically opposite ports communicative with a first transverse port and each other, said second set comprising a pair of diametrically opposite communicative ports with a second transverse port and means connecting said first transverse port to said second transverse port.

3. A key as set forth in claim 2 in which said cylinder is hollow and said diametrically opposite communicative ports in said second set of ports are connected together by a tube.

4. A key as set forth in claim 2 in which said cylinder is solid and the ports are intercommunicated by passageways in said cylinder.

5. A combination valve and key comprising a casing and a solid key rotatively mounted in said casing, said casing having a first pair of ports aligned in the upper level thereof and a second aligned pair of ports in the lower level thereof transverse to said first pair, said key having a first aligned pair of ports and a first transverse port in the upper level interconnected by passageway and a second aligned pair of ports and a second transverse port in the lower level, said second pair of ports being interconnected by a passageway, and said second transverse port being interconnected to said upper level passageways by a diagonal passageway.

References Cited in the file of this patent

UNITED STATES PATENTS

| | | |
|---|---|---|
| 1,086,982 | Bahruth | Feb. 10, 1914 |
| 1,282,650 | Studdard | Oct. 22, 1918 |
| 1,351,781 | Meushaw | Sept. 7, 1920 |
| 1,534,958 | Huss | Apr. 21, 1925 |
| 1,863,652 | Drew | June 21, 1932 |
| 2,515,252 | Niederer | July 18, 1950 |